United States Patent [19]

Allen

[11] Patent Number: 4,967,984
[45] Date of Patent: Nov. 6, 1990

[54] SLAVED TANDEM FREEWING (STF) AND DEVICE

[76] Inventor: Edward H. Allen, One Woodmere Dr., Apt. D, Petersburg, Va. 23805

[21] Appl. No.: 349,391

[22] Filed: Feb. 21, 1989

Related U.S. Application Data

[63] Continuation of Ser. No. 75,539, Jul. 20, 1987, abandoned.

[51] Int. Cl.$^5$ ............................................. B64C 3/00
[52] U.S. Cl. .............................. 244/35 R; 244/45 R; 244/48; 244/232; 244/229
[58] Field of Search .................. 244/82, 45 R, 48, 78, 244/35 R, 87, 229, 232

[56] References Cited

U.S. PATENT DOCUMENTS

| | | | |
|---|---|---|---|
| 985,126 | 2/1911 | Baumann | 244/232 |
| 1,120,957 | 12/1914 | Mayer | 244/233 |
| 1,249,593 | 12/1917 | Bullington | 244/233 |
| 1,419,416 | 6/1922 | Shirl | 244/231 |
| 1,593,490 | 7/1926 | Fortescue | 244/232 |
| 1,627,004 | 5/1927 | Albessard | 244/231 |
| 1,811,149 | 6/1931 | Petersen | 244/222 |
| 1,832,334 | 11/1931 | Tarbox | 244/82 |
| 1,869,326 | 7/1932 | Ludlow | 244/233 |
| 2,082,674 | 6/1937 | Young | 244/82 |
| 2,089,515 | 8/1937 | Welsher | 244/82 |
| 2,222,204 | 11/1940 | Newman et al. | 74/471 R |
| 2,342,779 | 2/1944 | Zerangue | 244/232 |
| 2,347,230 | 4/1944 | Zuck | 244/82 |
| 2,424,889 | 7/1947 | Holmes | 244/233 |
| 2,445,940 | 7/1948 | Copeland | 244/225 |
| 2,541,922 | 2/1951 | Hosford | 244/82 |
| 2,601,962 | 7/1952 | Douglas | 244/82 |
| 2,747,816 | 5/1956 | Howard | 244/82 |
| 3,086,731 | 4/1963 | Beckington | 244/52 |
| 3,319,594 | 5/1967 | Gianoli | 244/82 |
| 3,587,770 | 6/1971 | Flower | 244/82 |
| 4,124,180 | 11/1978 | Wolowicz | 244/82 |
| 4,568,043 | 2/1986 | Schmittle | 244/48 |
| 4,596,368 | 6/1986 | Schmittle | 244/48 |

FOREIGN PATENT DOCUMENTS 1281268 10/1968 Fed. Rep. of Germany ........ 244/48
997207 6/1945 France ................................. 244/45

OTHER PUBLICATIONS

Porter et al., "Evaluation of the Gust-Alleviation Characteristics and Handling Qualities of a Free-Wing Aircarft", National Aeronautics and Space Administration, NASA CR-1523, pp. 1-63, Jul. 1970.

Porter et al., "Investigation of the Applicability of the Free-Wing Principle to Light, General Aviation Aircraft", National Aeronautics and Spaces Administration, NASA CR-2046, pp. 1-118, Jun. 1972.

Porter et al., "Analytical Study of a Free-Wing/Free-Trimmer Concept", National Aeronautics and Space Administration, NASA CR-2946, pp. 1-114, Feb. 1978.

Porter et al., "Extended Analytical Study of the Free-Wing/Free-Trimmer Concept", National Aeronautics (List continued on next page.)

Primary Examiner—Joseph F. Peters, Jr.
Assistant Examiner—Anne Sartelle
Attorney, Agent, or Firm—Foley & Lardner, Schwartz, Jeffery, Schwaab, Mack, Blumenthal & Evans

[57] ABSTRACT

A system is disclosed wherein two or more lifting surfaces of an aerodynamic, hydrodynamic or other fluid dynamic device may be linked into a single system that in some circumstances improves the functioning of the device. An important species of the invention is the "Slave Tandem Freewing" airplane—an airplane with two flying surfaces (a wing and tail) both of which are free to rotate about a spanwise axis but are linked together in rotation by a linkage mechanism. Such an airplane exhibits significant improvements in performance and handling including attentuated responses to atmospheric turbulence, freedom from stall and spin, and higher than customary maneuverability. The same device may be built as submarine, boat or other fluid dynamic device.

12 Claims, 1 Drawing Sheet

OTHER PUBLICATIONS and Space Administration, NASA CR-3135, pp. 1-85, Apr. 1979.

Ormiston, "Experimental Investigation of Stability and Stall Flutter of a Free Floating Wing V/Stol Model", National Aeronautics and Space Administration, NASA TN D-6831, pp. 1-40, Jun. 1972.

Wolfe, "The Spratt 'Controlwing' Flying Boats", *Sport Aviation*, pp. 32-33, Jul. 1972.

Cox, "New Spratt Control Wing Flown", *Sport Aviation*, p. 36, Dec. 1973.

Spratt, "The Controlwing Aircraft", Sport Aviation, pp. 48-53, Jun. 1974, Part Two contiued in *Sport Aviation*, pp. 25-30, Jul. 1974.

Townsend, "'Movable Wing' Controls Flying Boat", *The AOPA Pilot*, vol. 12, No. 9, pp. 48-50, Sep. 1969.

Moran, "Control Surface Sizing Model for the Torsionally Free Wing", General Dynamics, Fort Worth Div., ERR-FW-1555, Dec. 1973.

Gee et al., "Flight Tests of a Radio-Controlled Airplane Model with a Free-Wing, Free-Canard Configuration", NASA-TM-72853, Mar. 1978.

SLAVED TANDEM FREEWING (STF) AND DEVICE

This application is a continuation of application Ser. No. 07/075,539, filed July 20, 1987 now.

REFERENCES CITED

U.S. Patent Documents

Ref. 1: Daniel R. Zuck U.S. Pat. No. 2,347,230, Apr. 25, 1944, (expired).

Other Documents

Ref. 2: Townsend, Lew: "Moveable Wing Controls Flying Boat", The AOPA Pilot, Vol. 12 No. 9, Sept. 1969.

Ref. 3: Porter, Richard F.; and Brown, Joe H., Jr.: "Evaluation of the Gust Alleviation Characteristics and Handling Qualities of a Free-wing Aircraft." NASA CR-1523. July 1970.

Ref. 4: Porter, Richard F.; and Luce, Ross G.; and Brown, Joe H., Jr.: "Investigation of the Applicability of the Free-wing Principal to Light General Aviation Aircraft." NASA CR-2046, June 1972.

Ref. 5: Porter, Richard F.; Hall, David W.; Brown, Joe H., Jr.; and Gregorek, Gerald M.: "Analytical Study of a Free-wing Free-trimmer Concept". NASA CR-2946, Feb. 1978.

Ref. 6: Porter, Richard F.; Hall, David W.; and Vergara, Rudolfo D.: "Extended Analytical Study of the Free-wing/Free-trimmer Concept". NASA CR-3135, Apr. 1979.

Ref. 7: Ormiston, Robert A.: Experimental Investigation of Stability and Stall Flutter of a Free-floating Wing V/STOL Model. NASA TN D-6831, June 1972.

Ref. 8: Moran, W.J.: Control Surface Sizing Model for the Torsionally Free Wing. General Dynamics, Fort Worth Div., ERR-FW-1555, Dec. 31, 1973.

Ref. 9: Gee, Shu W.; and Brown, Sanuel R.: "Flight Tests of a Radio Controlled Airplane Model with a Free-wing/Free trimmer Concept. NASA TM-72853, Mar. 1978.

Ref. 10: Wolfe, G.W.: "The Spratt 'Controlwing' Flying Boats", SPORT AVIATION, pp 32-33, July 1972.

Ref. 11: Cox, J.: "New Spratt Control Wing Flown", SPORT AVIATION, p. 36, Dec. 1973.

Ref. 12: Spratt, G.G.: "The Controlwing Aircraft", SPORT AVIATION, pp. 48-53, Jun. 1974, and continued at pp. 25-30, July 1974.

BRIEF SUMMARY OF THE INVENTION

The invention is a means of interlinking movable aerodynamic or hydrodynamic lifting surfaces so that a single, balanced and stable fluid dynamic system is created. This system has application to airplanes as well as submarines and boats and perhaps elsewhere. One species of the invention is the "slaved tandem freewing" or STF airplane configuration. A freewing is a fluid dynamic lifting surface as disclosed by Zuck (ref. 1) free to rotate about a spanwise axis. An STF airplane is an airplane with at least two freewings linked together in rotation so that as one wing rotates the second wing also rotates. The STF airplane embodiment illustrates all of the benefits of the invention: (a) the system tends to attentuate gust loads on the airplane, thus improving the ride quality; (b) the system is characteristically incapable of stall, spin and several other aerodynamic non-linearities all suspected of contributing to higher accident rates; (c) the system permits the airplane's thrust to be vectored in directions other than the flight path leading substantial improvements in maneuverability including near vertical take-offs and landings and remarkably small radius turns and pull ups.

BRIEF DESCRIPTION OF THE SEVERAL VIEWS OF THE DRAWINGS

FIG. one is a schematic diagram of an embodiments of the invention, showing the mechanical layout of minimum required two fluid dynamic lifting surfaces and a generalized interconnecting linkage: the fashion of operation of this system is set forth hereinbelow.

FIG. two is a graph of the forces and positions of the lifting surfaces; those steeped in the art refer to this graph as a stability graph. Briefly, this graph shows that the STF system will seek an equilibrium position at a certain point (where the sum of all torsional forces is zero) and that a range of equilibrium points may be selected by the designer and the operator by selecting certain key parameters. Further significance of this graph is set forth hereinbelow.

Figure 1:
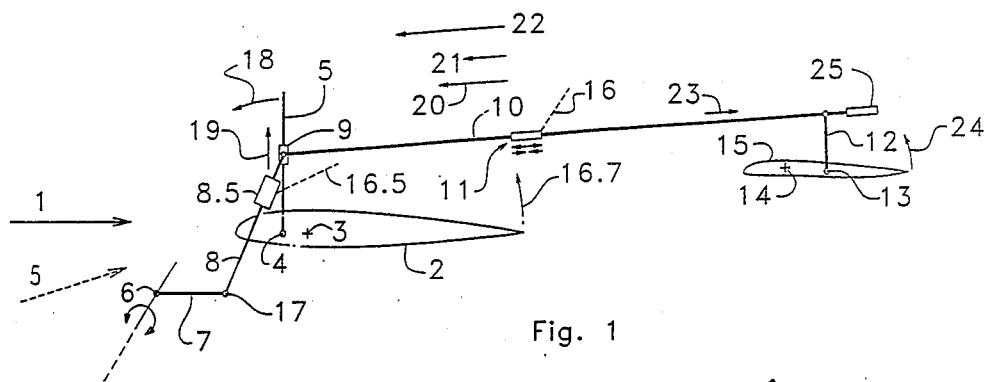

FIG. three comprises a schematic and stability graph for a another embodiment of the invention the model GPT-350 airplane. In this embodiment of the invention, offered by way of example, parameters selected reflect a conservative design approach. A unique feature is the reduction of force applied to the linkage by the lifting surfaces to near zero.

BACKGROUND OF THE INVENTION

The invention relates to the field of the "torsionally free wing" aero- or hydrodynamic devices ("freewing AHD's" or simply "freewings"). More specifically, the invention relates to a means in which two torsionally freewings are colocated in a single system including a means to link the two wings in rotation.

A freewing — originally designed for application to an airplane but useful also in other AHD's such as the keels of racing sailboats — is a wing free to rotate about a spanwise axis transverse to the free stream fluid flow. Such a freewing is free to "weathervane" into the relative flow, and, when properly designed, seeks and maintains a stable or "equilibrium" position determined only by the aero- or hydrodynamic forces of the moving fluid. In the case of an airplane wing, one is primarily concerned with the amount of lift generated; lift is a function of the absolute angle of attack of the wing and a freewing can be designed to seek and maintain a stable, predetermined angle of attack (and hence lift) in an environment in which the fluid flow direction changes randomly (i.e., turbulence).

Zuck (ref. 1) teaches that all stable AHD's adapt to changes in flow direction by pitching into the freestream. The advantage of the freewing concept is that given any AHD, the torsionally free portion (e.g., the wing of an airplane) may be designed with a substantially lower moment of inertia than the device as a whole and thus may achieve a faster dynamic response. The rate of response in turn determines the transitory structural and other loadings imposed on the device by changes in the flow direction. The lower the induced "gust" loads the lighter and more reliable the structure and the less susceptible the device to non-linear behaviors like stall, flutter and cavitation.

The incremental load imposed on an AHD device by a random change in flow direction (the induced load) is inversely proportional to the base loading of the fluid dynamic surfaces. As the base loading is reduced the incremental load from any given change in the freestream is increased. In an airplane wing, this means: as the wing loading (total airplane weight divided by the area of the wings) is reduced the G-loading resulting from a given gust is increased. In recent years, interest in very low wing loading airplanes (e.g., Ultralights and Air Recreational Vehicles, V/STOL, etc.) has increased substantially. In these devices, the dangers of operating in a turbulent environment are compounded by such low base loadings. Ultralight airplanes sustain shocks of several tens of G's from even quite modest turbulence these shocks are often larger than the structure can sustain (more than two thirds of the presently reported ultralight airplane accidents involve structural failure and/or accelerated stalls in turbulence). If the time constant of the airplane's response to turbulence could be reduced many, perhaps most of these accidents would no longer result in fatalities or be completely avoided.

The freewing concept offers the potential for improved safety in these low base load AHD devices. Yet the freewing concept has not been widely exploited since its disclosure in 1944 by D. R. Zuck (Ref. 1) and independently by George K. Spratt and others even earlier (Refs. 2, 10, 11, and 12, no patent issued). Part of the explanation for the lack of interest appears to be that lightly loaded AHD's did not always enjoy the popularity they do now; additional reasons appear to be that the embodiments of the Zuck/Spratt concept were defective in a number of important respects: their complexity, weight and cost was considerably higher than conventional, fixed wing airplanes; their stability and their resistance to flutter and cavitation was questionable and the trajectory of the aerospace and AHD research of the day was toward the development of stronger materials rather than toward devices which did not require such materials. The times have, however, changed and the stability of the freewing concept has been established by the work of Porter et al (Ref.3 through 6) and the trajectory of aerospace research has shifted. The problems of complexity, weight and cost remain, however.

In addition to the advantages of stall resistance and gust load alleviation, a third key advantage of the freewing concept is the potential it offers for controlling the attitude of an AHD body independently of the attitude of its working surfaces. Thus, for example, the lifting force of a racing sailboat's keel plane can be made to vary independently of the hull attitude and displacement; such an application could be used to reduce the sailboat's drag. In an airplane this same potentiality can be used in several ways including "vectoring" engine thrust in order to enhance maneuverability, take-off and landing performance. We call this potentiality Variable Incidence Control (hereinafter VIC) of which "thrust vectoring" is a prime example. Other examples include drag reduction, etc.

The Zuck/Spratt freewing concept was originally aimed at producing a stall proof airplane and made no attempt to develop the VIC potential. Neither Zuck's nor Spratt's airplane can be thrust vectored to any substantial degree in part because high fuselage angles of attack while safe with respect to the main freewing will stall the tail surfaces and result in aerodynamic instabilities.

The invention claimed herein is the VIC-capable AHD which, in its most general form requires not less than two distinct freewings. To those conversant with the art it is obvious that a freewing applies force to its parent AHD body only at its mechanical attachment point (the freewing pivot point); thus, if body attitude control is required, a second force application is required. Moreover, if as is also obvious, force must be applied at this second point independently of body attitude, a second freewing is required. It can also be shown by anyone versed in the art that an AHD with two freewings is statically and dynamically unstable in all but a very few design cases. Thus the invention claimed includes a means wherein sufficient "information" and control is passed between the two freewings so as to achieve stability of the entire system. The resulting system, then, includes at a minimum, two freewings and linkage (mechanical, electrical, fluidic, etc.) between them.

The design equation for a freewing is an equation which determines the moment generated by the wing in terms of the known aerodynamic variables:

$$Mn = Cmn * q * S * C \quad (1)$$

$$Cmn = (n - ac) * Cl + Cmo \quad (2)$$

where $Mn$ is the moment about the wing's pivot axle, $Cmn$ the coefficient of moment about the pivot axle, $q$ the dynamic pressure, $S$ the wing area and $C$ the wing chord, $n$ the pivot point in percentage of the chord aft from the leading edge, $ac$ the wing's aerodynamic center again in percentage of the chord aft of the leading edge, $Cl$ the coefficient of lift and $Cmo$ the wing's coefficient of moment about the aerodynamic center at zero lift. A Zuck/Spratt freewing must always operate at moment of zero (i.e., at a point where the wing has no tendency to rotate in either direction). Thus the first restriction on a Zuck/Spratt freewing is the equilibrium condition:

$$Mn = 0 \text{ (equilibrium)} \quad (3)$$

The second restriction required of the Zuck/Spratt freewing is the requirement that any disturbance to the freewing must trigger a response that results in the return of the freewing to its design equilibrium. This restriction is equivalent to requiring that the derivative of the moment coefficient in equations (1) and (2) above with respect to the coefficient of lift must be negative:

$$d\,Cmn/d\,Cl < 0 \text{ (stability)} \quad (4)$$

This stability requirement is almost always met by requiring that the pivot axle be located ahead of the aerodynamic center (but may be met in other ways); i.e.:

$$n < ac \text{ (stability)} \quad (4')$$

From the above design equations it may be deduced that control of the lift generated by a freewing may be had by adjustment of any number of variables; this can be clarified by combining and simplifying the equations above:

$$L = (-Cmo * q * S)/(n - ac) \quad (5)$$

where L is the lift generated. Thus lift control may be had by varying the zero lift moment coefficient (that is, increasing or decreasing the effective camber of the wing with flaps or trimmers a la Zuck), varying the pivot axle point, n (by, for example, incorporating variable sweep wings—no known examples) or varying the location of the wing's aerodynamic center with variable trailing edge geometry or blown air (no known examples).

DETAILED DESCRIPTION OF THE INVENTION

The invention is a system comprised of two classes of subsystems: (a) freewings and (b) interconnections. These subsystems or components can be assembled in any number and in numerous combinations into a single operating system. This operating system constitutes the invention; the number of components and of combinations of them constitute variations of the invention. The simplest version of the invention is by definition comprised of three components: two freewings and an interconnecting linkage. The freewings are freewings in the sense of Zuck except that the equilibrium criterion of equation (3) and the stability criterion of equation (4) need not apply to any single component freewing in order to apply to the system as a whole. Thus, for example, the moment acting at any selected pivot axle need not vanish; rather it must be balanced by the moments generated in the rest of the system. Similarly, the slope of the moment coefficient with respect to the coefficient of lift of any particular component need not be negative provided the slope of moment/lift curve for the system as a whole is negative. Because the moment about any one freewing axle does not in general vanish in an STF airplane the design equation corresponding to equation (5) above reveals that the lift generated by an STF freewing component is a function of the same variables as a Zuck/Spratt freewing plus two additional variables: the chord, C, and the moment, Mn:

$$L = (Mn/C - Cmo * q * S)/(n-ac) \quad (6)$$

Further, and also because at least two wings are tied together by a linkage, each freewing can be characterized by an equation similar to equation (6). Assuming that there are two such freewings and an interconnecting linkage (the simplest case), and rearranging terms we can derive the basic design equation for an STF airplane; this equation, essentially states that, in the simple two-wing case, the wing moments must, in general, be equal and opposite in sign except for a multiplier called the "gearing ratio":

$$Mn\{wing\ 1\} = k * Mn\{wing\ 2\} \quad (7)$$

where k is the gearing ratio and by convention must be negative in a stable airplane. This simple definitional equation is then easily expanded to the above mentioned design equation:

$$L * C*(n-ac) + Cmo * q * S * C\{wing\ 1\} = k* (L * C*(n-ac) + Cmo * q * S * C)\{wing\ 2\} \quad (8)$$

That one set of variables refers to the one wing and the other set to the other wing does not mean that we have twice as many variables to effect control because, in general, the designer will want to restrict the ratios between the various factors in order to achieve stability and other goals. In the limiting case there are only three more variables than in the conventional freewing case with which to effect control: the gearing ratio, k, the wing moment ratio, Mn(wing 1)/Mn(wing 2) and the ratio of the wing chords, C(wing 1)/C(wing 2). Of these additional variables the moment ratio is not independent of the others while the chord ratio would be mechanically difficult to change and thus the gearing ratio alone is interesting for purposes of effecting control.

While the invention covers all cases of the relative locations for any number of freewing components, the general case is one in which one wing is positioned on the vehicle body in such a way so that it enters a region of disturbed fluid before the other; that is, the general case is one in which one wing is longitudinally displaced with respect to the other in the stream flow. In such a case there is a delay between the time when the disturbance imposes a deflection on one wing and when a balancing force appears on the other wing. During this brief hiatus, the system is no longer balanced by the natural aerodynamic forces and its behavior depends more nearly upon the characteristics of each subsystem component in isolation than on the system's design as a whole. This phenomenon means that, in general, one wing, the lead wing is the master or driver wing while the other(s) is (are) the driven or slave wing. It is obvious to those practiced in the art that the master wing must, like the conventional freewing, be stable in its own right; that is, when disturbed, it must seek to return to its equilibrium lift point by virtue of its own design rather than by virtue of any external force applied to the wing from the linkage mechanism via the pivot axle. This further means that the master wing must be pivoted about a point ahead of its aerodynamic center just as is the case with a Zuck/Spratt freewing. Conversely, the return of the disturbed master wing to equilibrium will be hindered by the slave wing if the slave is stable, unaffected by the slave if that slave is neutral and helped by the slave wing if the slave is unstable; it follows then that it is desirable that the slave wing be somewhat neutral or unstable. It also follows that a configuration in which there is no longitudinal displacement between the two wings is less desirable than one in which there is some displacement. For this reason, the invention is alternatively referred to as the Slaved Tandem Freewing configuration rather than, say, the Linked Twin Freewing—while the invention includes such a configuration, the preferred embodiment entails both a longitudinal displacement of the wings (a tandem wing) and a master/slave-style linkage between them.

The invention also distinguishes between inputs to the system as a whole applied by the natural fluctuations in the freestream and those applied by the pilot for control purposes. Inputs from natural fluctuations are applied to the master wing; inputs from the pilot are applied to the gearing ratio and to other elements of the linkage and/or control system. The purpose for this fundamental distinction is the requirement that the system must behave differently as a result of each input: an input from an environmental disturbance must result in the airplane returning to its original equilibrium, an input from the pilot must result in the system seeking a new equilibrium. If the wings are longitudinally displaced (the general case), the vehicle must incorporate angular stability features which cause the line drawn between the two pivot points to return to its original orientation when disturbed as well as those previously mentioned stability features which cause the lift to remain roughly constant; this angular stability is in addition to the longitudinal, the directional, and the roll stability customarily required of aerohydrodynamic vehicles. In general, the vehicle must respond to a shift in the freestream flow direction by maintaining its lift coefficient and rotating its angular alignment so as to maintain the same alignment relative to the free stream as before. The maintenance of the lift coefficient is a fast response because the moment of inertia of the wings about their pivot axles is small; the realignment of the line between the pivot centers is a slow response because it requires the rotation of the whole airplane whose moment of inertia about its CG is relatively larger. Thus when inputs are applied to the master wing, with positive angular stability, the line between the pivot points must reposition itself with respect to the horizon in order to maintain it's relative position with respect to the free stream. On the other hand, when inputs are applied to the gearing ratio for control purposes and again assuming positive angular stability, these inputs must not disturb the angular alignment unless a change in the freestream direction is intended. The angular alignment is, for control purposes considered another degree of freedom of the airplane and thus an STF airplane is characterized by four axes of control as conpared to the customary three axes of the conventional airplane.

In order to achieve positive angular stability the gearing ratio must be restricted to the range below negative one. When the master wing is caused to rotate by virtue of entering a gust front, the angle of incidence is said to be characterized by a "delta a" (a small change in its angle of incidence with respect to the fuselage). The corresponding "delta a" of the slave wing must be somewhat less in order to achieve an imbalance of the lifting forces required to rotate the fuselage so that the line between pivot centers is repositioned to maintain its alignment with the freestream. This in turn requires a gearing ratio less than negative one (a gearing ratio of negative one would result in neutral angular stability and one greater than negative one would result in angular instability).

Likewise, with respect to longitudinal stability, the STF system as a whole must, in general, operate at the point where the moments are equal and opposite (and thus vanish) and the slope of the curve of the moments with respect to lift must be negative as with conventional airplanes. In general this curve will be some additive function of the moment/lift curves of the individual freewing components that may be modified somewhat by the design of the linkage mechanism. As a practical matter a simple linkage in which a control horn on the master wing pivot axle is linked through a push rod to a similar control horn on the pivot axle of the slave wing will not always exhibit the required stability (negative slope) because of limitations on the design flexibility of thin airfoil sections that have been established over the years. These design limitations are particularly restrictive given the other objectives of the STF configuration such as reduced weight, simplicity and low cost. As a result an additional feature must be introduced into the linkage mechanism which produces the desired stability. This feature is an automatic adjustment which renders the gearing ratio a function of the angle of incidence of the wings. Thus as the master wing rotates, in say a pitch up direction, the gearing ratio is decreased slightly so as to augment the stability.

FIG. 1 discloses a simple mechanical linkage species of the invention in schematic form. The device illustrated could apply equally well to a hydrofoil water surface vessel, a submarine, an airplane or, indeed, any AHD device. In the figure the following items are identified for purposes of orientation: (1) the freestream fluid flow vector, (2) the master wing with its aerodynamic center (3) and its pivot point (4), the master wing control horn (5) which is a simple rod extending at 90 degrees from the master wing pivot axle, the "collective lift" control shaft (6) which can be rotated by the pilot to vary the lift of both wings together, (7) the collective lift shaft horn, (8) the slider mechanism idler arm which is fitted with an appliance (8.5) that allows the operator (through a control input at point 16.5) to make it longer or shorter, (9) the slider, (10) the push rod linking the master to the slave wing, (11) the "differential lift" control mechanism which is an alternative pilot control input device affecting the length of the push rod (control is channeled into the device at point (16) the device could be a jack screw, a hydraulic cylinder or any other means for adjusting the length of the push rod; this input point is an alternative to that of point 16.5 and research has not yet established which point is best), the slave wing control horn (12), the slave wing pivot axle (13), the slave wing (15) with its aerodynamic center (14).

Figure 2:
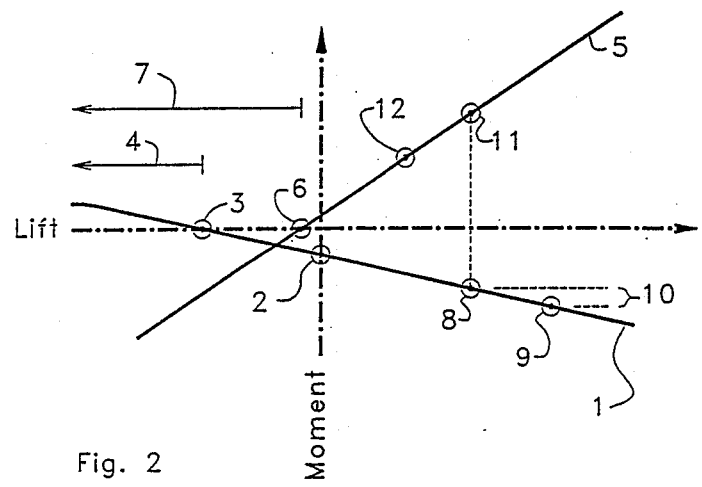

In the embodiment depicted in FIG. 1, the master wing is designed so as to have a negative zero lift moment coefficient and its pivot axle is installed in the wing so that the component assembly is stable. The stability graph for the system as a whole together with those for each component in isolation appears in FIG. 2. The stability graph for the master wing (designated (1) in FIG. 2) reveals that the wing is stable (the curve slopes downward to the right). The master wing is a common, thin airfoil with a conventional camber resulting in a negative (i.e., a pitch down) zero lift moment at point (2). The master wing's moment is negative throughout its operating range; operations at large negative lifts (the region (4) to the left of the zero moment point (3) is prohibited by stops (not shown) installed on the mechanism). By contrast, the slave wing's moment (5) is positive throughout its entire permissible range of operation and thus it also must be prohibited from operation at large negative lifts below its zero moment point (6) in its prohibited region (7). In order to produce a consistently positive moment the slave wing must have its trailing edge turned up somewhat resulting in a "reflexed" airfoil (see item 15 in FIG. 1).

The selection of the pivot points in terms of percentage of the chord determines the slope of the stability curves. In FIG. 1 the illustrated system features a master wing (2) with a pivot point (4) somewhat ahead of the aerodynamic center (3) so that the wing is stable in its own right. The aft wing pivot point (14) is then selected so as to minimize or eliminate any need for counterweights to assure the system is mass balanced (all freewing systems must be carefully mass balanced about their pivot points).

The operation of the system has two modes: in one mode, the system is operated by natural aerodynamic forces when the vehicle enters a region in which the fluid flow vector (see FIG. 1) has changed from its initial, quiet-fluid orientation (1) to some new orientation (15) reflecting the sum of the vehicle's velocity vector and the fluid's velocity vector. This new orientation results in the master wing rotating in such a way as to "weathervane" into the relative free stream (the rotational movement is shown as a directed arc (16) in FIG. 1). In this mode of operation, the pilot makes no control inputs and thus the mode is said to be a "stick fixed" mode; in a stick fixed mode, the position of the lower end (17) of the slider mechanism idler arm (5) is fixed as is the length of the push rod (10) which is pilot-controlled by the device at point (11) in the FIG. 1. With these variables fixed, rotation of the master wing causes the master wing control horn (5) to rotate through a corresponding circular arc (18) which in turn causes the slider mechanism (9) to move along the control horn in the direction indicated by the arrow (19) effectively lengthening the control horn and reducing the apparent amount of force applied by the master control horn to the front of the push rod from its initial value (20) to a somewhat smaller value (21); the real amount of force applied is actually increased (see below). To clarify the situation, refer now to FIG. 2, where the original operating point of the master wing is designated as point (8). When the vehicle first encounters the shifted freestream flow and before rotation can begin the operating point of master wing shifts from (8) to (9), that is, the lift on the master wing increases. Because the slope of the master wing's stability curve (1) is negative, the increased lift results in a corresponding negative increase in the master wing moment; the amount of this negative moment increase is designated in FIG. 2 as the distance (10). This increase is sufficient to cancel and overcome the reduction in the apparent force vector (21, FIG. 1) applied at the front end of the push rod; thus the net result is that the force vector at the front end of the push rod shifts from (20, FIG. 1) to (22) and the entire assembly begins to rotate in a pitch down direction.

While the master wing is beginning its operation, the slave wing (15, FIG. 1) is still operating in the original fluid flow field (characterized by the vector (1, FIG. 1). Thus its operating point begins at point (11, FIG. 2), the point where it precisely balances the original push-rod force (20) generated by the master wing even though the master wing push-rod force has increased from (20, FIG. 1) to (22). The resulting imbalance of forces applied to the push rod by the two wings results in the movement of push rod (10) in a forward direction which in turn pulls on the slave wing control horn (12) and causes the slave to rotate through a directed circular arc (24). Because the slave is unstable (its lift/moment curve (5, FIG. 2) has a positive slope), once it is moved off its equilibrium point (11, FIG. 2) toward a lower lift value (recall it is rotating in a pitch down direction but it is still within the original flow field on vector (1) in FIG. 1 because of the time delay between when the new flow field arrives at the master wing and when it arrives at the slave). Its moment tends to decrease which in turn decreases the force applied by the slave control horn (12, FIG. 1) to the end of the push rod. The effect of this phenomenon is to accelerate the rotation of the assembly in the pitch down direction. This acceleration would continue without limit except that, as the master wing rotates in the pitch down direction it moves from point (9) back to point (8) on the stability graph in FIG. 2 thus lowering the magnitude of the moment and the force it applies to the push rod.

This first phase adjustment sequence is relatively stable and if allowed to continue the force generated by the master wing would progressively decrease while the countervailing force applied to the push rod by the slave wing would likewise progressively decrease and the assembly would continue to rotate in the pitch down direction without limit (other than mechanical). However, the rate of rotation is fixed at some finite value which is a function of the assembly's moment of inertia, friction coefficient, and the new fluid flow vector all as affected by the differing rates at which the force coefficients applied to the push rod by both wings decrease; in the simplest case these force coefficient decrease at the same rate thus holding the force differential at a constant value and resulting a constant and finite rotational velocity. In addition, the forward speed of the vehicle is some finite value that can not fall below a fixed stall value.

By and by, the slave wing also enters the new fluid flow field and the time constants involved can be designed so that the amount of rotation of the assembly is appropriate during the brief period when the master wing is in the new flow field and the slave in the old. In fact the time delay that creates this hiatus will not be greater than about 0.25 second for a practical airplane or hydrofoil boat and will more commonly be less than 0.1 second. The time constant for the rotational motion of the assembly in any practical application is not likely to permit terminal rotation rates in excess of a few tens of degrees per second and can be easily slowed by the addition of fluidic dampers. Such a fluidic damper (25) is shown in FIG. 1. Assuming the fluidic damper together with the other time constants results in a system which does not overshoot the desired new equilibrium point, the mechanism is also dynamically stable.

Once both wings are in the same fluid flow field conditions (i.e., the hiatus period has passed) the mechanism again is stable but this time at a zero rotational velocity rate because the angle of attack and the lift of the slave wing has increased as has its corresponding moment thus arresting the rotational motion of the assembly. The overshoot damper (25, FIG. 1) also serves to assist in the arresting action. To clarify, refer to FIG. 2: at time t=0 (initial conditions) the master wing is operating at point (8) and the slave at point (11); at time t=1, (the master wing in the new flow field, the slave still in the old) the master wing is operating at point (9) and the slave still at point (11) which results in an imbalance that moves the push rod (10, FIG. 1) forward and causes a rotation of the wings (both master and slave) in the pitch down direction which achieves a dynamically determined, finite maximum rate which may be held to any design-selected terminal value, if desired by an overshoot damper (25, FIG. 1); during the time period between t=1 and t=2, the mechanism rotates until the slave wing is operating at (12, FIG. 2) and the master wing at point (8); at t=2 the slave wing becomes engulfed in the new fluid flow field as well so that its lift and moment are effectively increased back to point (11) resulting in the arrest of the rotational cycle of the assembly.

Figure 3A:
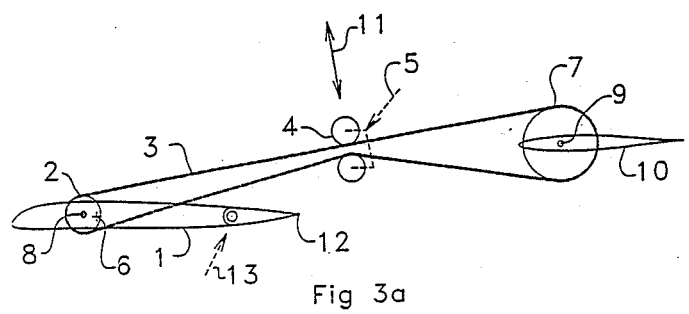

In FIG. 3, is shown an embodiment of the invention as incorporated in a GTP-350 airplane (designed by the inventor). In FIG. 3a, a schematic of the mechanical linkage is shown revealing the use of cable/drum system; the front wing (FIG. 3a, 1) is pivoted at a point (8.) ahead of its aerodynamic center (6.); at this pivot point is attached a cable drum (2.) around which is wrapped several turns of a cable (3.) which completes a circuit with several turns around the rear wing cable drum (7.). Thus, just as in the embodiment of FIG. 1, the front and rear wings rotate together and in the same sense except as moderated by a gearing ratio which in this case is not adjustable and is equal to the negative of the ratio of the diameter of the rear drum to the front drum. The rear wing (10.) in this embodiment is pivoted at a point (9.) which is precisely at its aerodynamic center. The cable/drum system was selected over the pushrod system in order to avoid the leverage changes resulting from the use horns moving through lengthy arcs. Likewise, from the schematic one can envision the system of additional pulleys (4.) used to control by the relative incidence between the two freewings. This system operates by sliding the two pulley block (4.) along a line (11.) which has the effect of lengthening one cable while shortening the other and thus changing the relative incidence of the wings. This is a pilot controlled input (signified by the pilot input symbol at 5.): it is equivalent to pushing the control stick fore and aft and results in shifts in the fuselage deck angle.

Figure 3B:
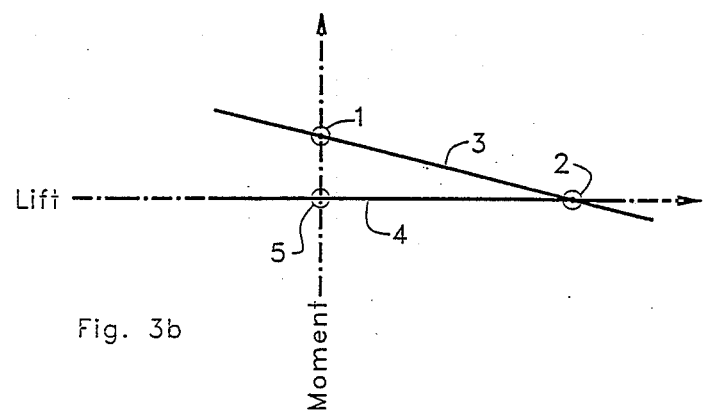

In FIG. 3b is shown the stability graphs for the system. The stability curve for the front wing is designated as 3. and slopes downward to the right meaning the wing is stable. Note that in this system the front wing airfoil is of special design (FIG. 3a, 1) so as to have a positive zero lift pitching moment coefficient (the zero lift pitching moment is designated as point 1. in FIG. 3b.). The rear wing's stability curve (4.) lies on the horizontal axis because it's pivot point is concentric with its aerodynamic center and it is a symmetrical airfoil — meaning its zero line moment coefficient is zero (5.). In the GTP-350, the front wing's equilibrium angle of attack (2.) is controlled by the variable chamber method (a trailing edge aileron as seen in FIG. 3a, 12. is directly pilot controlled FIG. 3a, 13.) as proposed by Zuck and studied by Porter et al. Further because the rear wing is a symmetrical airfoil and is pivoted at its aerodynamic center, no moment forces are generated by the rear wing at any angle of attack within the applicable range. As a result in this embodiment, the front wing may be said to transmit no static moment force to the linkage — only position information is transmitted. Likewise, the rear wing is moment free and no force is required to hold the rear wing in its static position. This linkage design is a special case of the general design outlined above and is though to have the advantage of freeing the designer from concerns over the structural integrity of the linkage (i.e., there is no force transmitted by the linkage).

What is claimed is:

1. An apparatus comprising:
   a first and a second freewing each having an axle and being freely pivotable about respective axles thereof to a plurality of relative attitudinal positions;
   linkage means interconnecting the first and second freewings to pivot with each other in the same direction;
   first means connected to the first freewing for controlling the attitude of the first freewing; and
   second means connected to the linkage for controlling the relative attitudes of the first and second freewings.

2. The apparatus of claim 1, wherein said first and second freewings are interconnected such that a gearing ratio exists between them.

3. The apparatus of claim 2, wherein said gearing ratio is selectively variable.

4. The apparatus of claim 2, wherein said gearing ratio is fixed and invariable.

5. The apparatus of claim 1, wherein the first freewing is stable having an aerodynamic center displaced aft of the axle thereof.

6. The apparatus of claim 5, wherein the second freewing has an aerodynamic center coincident with the axle thereof, whereby no moment forces are generated by said second freewing and the force transmitted to said linkage to pivot said second freewing in response to pivoting of said first freewing is substantially zero.

7. The apparatus of claim 1, wherein said first freewing is positioned longitudinally forward of said second freewing.

8. The apparatus of claim 1, wherein said first means comprises an aileron mounted on said first freewing.

9. An apparatus comprising:
   a first and a second freewing each having an axle and being freely pivotable about respective axles thereof to a plurality of relative attitudinal positions;
   linkage means interconnecting the first and second freewings to pivot with each other;
   first means connected to the first freewing for controlling the attitude of the first freewing; and
   second means connected to the linkage for controlling the relative attitudes of the first and second freewings;
   said first and second freewings being interconnected such that a gearing ratio less than negative 1 exists between them.

10. An apparatus comprising:
    a first and a second freewing each having an axle and being freely pivotable about respective axles thereof to a plurality of relative attitudinal positions;
    linkage means interconnecting the first and second freewings to pivot with each other;
    first means connected to the first freewing for controlling the attitude of the first freewing; and
    second means connected to the linkage for controlling the relative attitudes of the first and second freewings;
    said first freewing being positioned longitudinally forward of said second freewing;
    said first freewing being a stable master freewing and said second freewing being a neutral slave freewing.

11. An apparatus comprising:
    a first and a second freewing each having an axle and being freely pivotable about respective axles thereof to a plurality of relative attitudinal positions;
    linkage means interconnecting the first and second freewings to pivot with each other;
    first means connected to the first freewing for controlling the attitude of the first freewing;
    second means connected to the linkage for controlling the relative attitudes of the first and second freewings; and
    a damper connected to said first freewing for limiting the pivoting rate of said first freewing.

12. An apparatus comprising:
    a first and a second freewing having an axle and being freely pivotable about respective axles thereof to a plurality of relative attitudinal positions;
    push-rod means interconnecting the first and second freewings to pivot both freewings in the same direction;
    first means connected to the first freewing for controlling the attitude of the first freewing; and
    second means connected to the linkage for controlling the relative attitudes of the first and second freewings.

* * * * *